US012643724B2

(12) United States Patent
Berlin et al.

(10) Patent No.: US 12,643,724 B2
(45) Date of Patent: Jun. 2, 2026

(54) BARRIER-COATED CELLULOSE-BASED SUBSTRATE, LAMINATED PACKAGING MATERIAL AND PACKAGING CONTAINER COMPRISING THE CELLULOSE-BASED SUBSTRATE

(71) Applicant: TETRA LAVAL HOLDINGS & FINANCE S.A., Pully (CH)

(72) Inventors: Mikael Berlin, Lund (SE); Jan Wahlberg, Eslöv (SE); Gloria Guidetti, Bologna (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 312 days.

(21) Appl. No.: 18/253,435

(22) PCT Filed: Dec. 21, 2021

(86) PCT No.: PCT/EP2021/087136
§ 371 (c)(1),
(2) Date: May 18, 2023

(87) PCT Pub. No.: WO2022/136463
PCT Pub. Date: Jun. 30, 2022

(65) Prior Publication Data
US 2024/0025610 A1 Jan. 25, 2024

(30) Foreign Application Priority Data
Dec. 22, 2020 (EP) .................................... 20216735

(51) Int. Cl.
*C01B 32/19* (2017.01)
*B32B 7/12* (2006.01)
(Continued)

(52) U.S. Cl.
CPC ................. *B65D 65/42* (2013.01); *B32B 7/12* (2013.01); *B32B 27/08* (2013.01); *B32B 27/10* (2013.01);
(Continued)

(58) Field of Classification Search
CPC .............................. C01B 32/198; B05D 7/534
See application file for complete search history.

(56) References Cited

U.S. PATENT DOCUMENTS 10,058,091 B2 * 8/2018 Wolf .................... A61M 1/0272
2011/0143070 A1 * 6/2011 Toft .................... C23C 14/5886
427/248.1
(Continued)

FOREIGN PATENT DOCUMENTS

| CN | 103459148 A | 12/2013 |
| CN | 104039695 A | 9/2014 |

(Continued)

OTHER PUBLICATIONS

Go et al. Synergistic effect of UV and I-ascorbic acid on the reduction of graphene oxide: reduction kinetics and quantum chemical simulations. Solid State Sciences. vol. 84. pp 120-125. Oct. 2018 (Year: 2018).*

(Continued)

*Primary Examiner* — Cachet I Proctor
(74) *Attorney, Agent, or Firm* — BUCHANAN INGERSOLL & ROONEY PC

(57) ABSTRACT

The present invention relates to a method for manufacturing a barrier-coated substrate web, coated with a layer of reduced graphene oxide. The invention further relates to laminated packaging materials comprising the barrier-coated substrate web, in particular intended for liquid carton food packaging, and to liquid carton packaging containers comprising the laminated packaging material.

10 Claims, 9 Drawing Sheets

Figure 1A:
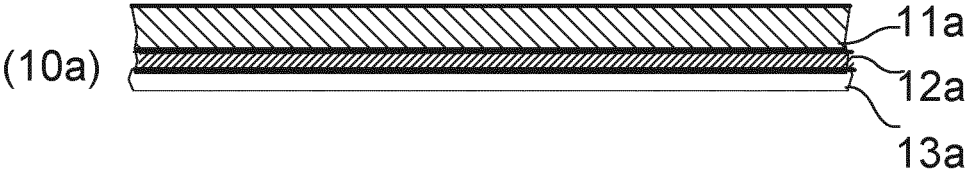

(51) Int. Cl.

| | |
|---|---|
| *B32B 27/08* | (2006.01) |
| *B32B 27/10* | (2006.01) |
| *B32B 27/16* | (2006.01) |
| *B32B 27/30* | (2006.01) |
| *B32B 27/32* | (2006.01) |
| *B32B 27/36* | (2006.01) |
| *B32B 37/24* | (2006.01) |
| *B65D 65/40* | (2006.01) |
| *B65D 65/42* | (2006.01) |
| *B65D 81/24* | (2006.01) |
| *C01B 32/194* | (2017.01) |
| *C01B 32/198* | (2017.01) |
| *D21H 19/38* | (2006.01) |
| *D21H 19/82* | (2006.01) |
| *D21H 27/10* | (2006.01) |

(52) U.S. Cl.
CPC ............ *B32B 27/16* (2013.01); *B32B 27/308* (2013.01); *B32B 27/32* (2013.01); *B32B 27/36* (2013.01); *B32B 37/24* (2013.01); *B65D 65/40* (2013.01); *B65D 81/24* (2013.01); *C01B 32/194* (2017.08); *C01B 32/198* (2017.08); *D21H 19/385* (2013.01); *D21H 19/826* (2013.01); *D21H 27/10* (2013.01); *B32B 2037/243* (2013.01); *B32B 2255/12* (2013.01); *B32B 2255/20* (2013.01); *B32B 2255/26* (2013.01); *B32B 2255/28* (2013.01); *B32B 2264/108* (2013.01); *B32B 2307/31* (2013.01); *B32B 2307/7244* (2013.01); *B32B 2310/0806* (2013.01); *B32B 2315/02* (2013.01); *B32B 2439/46* (2013.01); *B32B 2439/60* (2013.01); *B32B 2439/62* (2013.01); *B32B 2439/70* (2013.01)

(56) References Cited

U.S. PATENT DOCUMENTS

| | | | |
|---|---|---|---|
| 2012/0288692 A1 | 11/2012 | Broyles et al. | |
| 2014/0370246 A1 | 12/2014 | Hurt | |
| 2017/0047588 A1* | 2/2017 | Mukherjee ............. | C25D 17/00 |
| 2017/0106342 A1* | 4/2017 | Raveendran-Nair ....................... B01D 67/0044 | |
| 2020/0086610 A1* | 3/2020 | Borini ................... | B32B 38/145 |
| 2020/0215496 A1 | 7/2020 | Raveendran-Nair et al. | |
| 2024/0017534 A1 | 1/2024 | Wahlberg et al. | |

FOREIGN PATENT DOCUMENTS

| | | | | |
|---|---|---|---|---|
| CN | 105860143 A * | 8/2016 | ............... | C08K 3/04 |
| WO | 2009112255 A1 | 9/2009 | | |
| WO | 2013/040636 A1 | 3/2013 | | |
| WO | WO-2015145155 A1 * | 10/2015 | ............. | C01B 32/23 |
| WO | 2020/080919 A1 | 4/2020 | | |
| WO | 2021/005120 A1 | 1/2021 | | |
| WO | 2021/165290 A1 | 8/2021 | | |
| WO | 2022/117462 A1 | 6/2022 | | |

OTHER PUBLICATIONS

Longo et al. Green Solid-State Chemical Reduction of Graphene Oxide supported on paper substrate. Coatings. vol. 10. 2020 (Year: 2020).*

Su et al. Impermeable barrier films and protective coatings based on reduced graphene oxide. Nature Communications. vol. 5 article No. 4843. 2014 (Year: 2014).*

Zhang et al. Reduction of graphene oxide via L-ascorbic acid. Chemical Communications. vol. 24 pp. 1112-1114. 2010 (Year: 2010).*

Intention to Grant (Communication under Rule 71(3) EPC) issued on Sep. 5, 2025, in corresponding European Patent Application No. 21216620.1. (5 pages).

U.S. Appl. No. 18/253,406, filed May 18, 2023, Jan Wahlberg et al.

International Search Report (PCT/ISA/210) and Written Opinion (PCT/ISA/237) mailed Mar. 10, 2022, by the European Patent Office as the International Searching Authority for International Application No. PCT/EP2021/087136. (10 pages).

Su et al. "Impermeable barrier films and protective coatings based on reduced graphene oxide", Nature Communications, Sep. 11, 2014, pp. 1-10, XP002803212.

Office Action/Search Report (The First Office Action) issued on May 19, 2025, in corresponding Chinese Patent Application No. 202180082650.3 and English translation of the Office Action/Search Report. (17 pages).

* cited by examiner (10a)

11a
12a
13a (10b)

11b
14
12b
13b
15b (20a)

(20b)

51b  50b

52b

52b (50c)

64

62,62´

63

61

65

66

BARRIER-COATED CELLULOSE-BASED SUBSTRATE, LAMINATED PACKAGING MATERIAL AND PACKAGING CONTAINER COMPRISING THE CELLULOSE-BASED SUBSTRATE

TECHNICAL FIELD

The present invention relates to barrier-coated paper or cellulose-based substrates and to a method of manufacturing thereof, by dispersion coating of a barrier pre-coating and subsequent vapour deposition coating of a barrier deposition coating. The invention further relates to laminated packaging materials comprising such barrier-coated paper or cellulose-based substrates, in particular intended for liquid carton food packaging, and to such liquid carton packaging containers comprising the laminated packaging material.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk or core layer, of paper, paperboard or other cellulose-based material, and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally cuboid shape, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

A layer of an aluminium foil in the packaging laminate provides gas barrier properties quite superior to most other gas barrier materials. The conventional aluminium-foil based packaging laminate for liquid food aseptic packaging is still the most cost-efficient packaging material, at its level of performance, available on the market today.

Any other material to compete with the foil-based materials must be cost-efficient regarding raw materials, have comparable food preserving properties and have a comparably low complexity in the converting of materials into a finished packaging laminate.

Among the efforts of developing non-aluminium-foil materials for liquid food carton packaging, there is also a general incentive towards developing pre-manufactured films or sheets having high barrier properties, or towards combining several separate barrier materials in a multilayer film or sheet. Such films or sheets would replace the aluminium-foil barrier material in the conventional laminated packaging material and may further be adapted to conventional processes for lamination and manufacturing of laminated packaging materials.

In line with increased requirements to use only sustainable materials, polymeric barrier materials originating from fossil sources have become less interesting, and thus it remains to work with the types of thin barrier coatings which would be almost negligible in recycling processes and cause very little problems in an economy based on circulation of materials and renewable (non-fossil) materials, i.e. aqueous dispersion coatings and vapour deposition coatings. The thickness of a dispersion coated polymer is around 1-2 μm, while vapour deposited barrier coatings are as thin as below 0.5 μm, such as from 10 to 100 nm, such as from 15 to 80 nm, such as from 20 to 50 nm. Various such coatings have been developed since many years and have been combined in multilayer packaging material structures in search for an improved total performance. Although some of these coatings exhibit excellent barrier properties, the beverage carton packaging industry is still looking for optimal coatings or coating combinations, which would be able to replace aluminium foil in all respects.

Development materials of the past have e.g. concerned aqueous polymer compositions suitable for dispersion and/or solution coating of thin layers, such as PVOH, starch and the like. The common difficulty with this type of polymer binders is that they are sensitive to high moisture conditions and lose their inherent oxygen barrier properties with increasing exposure to, and content of, moisture, i.e. conditions in laminated packaging materials of filled, liquid carton packaging containers. It has been concluded that such thin, dispersion coated polymer layers need to be supplemented with further materials to improve gas barrier properties, either in the form of additional compounds in the dispersion composition, such as crosslinkers or inorganic particles, or in the form of additional material layers acting as barriers to water vapour.

Regarding vapour deposited (or so called "vacuum coated") barrier coatings, very good crack onset strain properties have sometimes been achieved, such that they are sufficiently robust for fold-forming and sealing of rigid packaging containers, but naturally, considering that such coatings are very thin, they are relatively sensitive to mechanical stress and damage, in comparison to an aluminium foil.

In later years, graphene has emerged as a potential barrier material, although it would be far too expensive for full-surface barrier coating in a packaging material. In theory, it might suffice with a merely one-molecule thick sheet of graphene to obtain excellent gas barrier property, but in practice, such thin layers are very expensive and difficult to produce. As an alternative, single-layer flakes of graphene may be dispersed in an organic solvent and coated by dispersion coating or printing technologies, but also this variant of graphene layers would be too expensive to include as full-surface coatings into single-use packaging materials. Moreover, the removal of the organic solvent from such a coating constitutes an undesirable problem in modern, sustainable, industrial scale coating operations.

A much cheaper source of material for a similar barrier coating with equal or similar properties to graphene, would be graphene oxide flakes or particles which have been exfoliated from graphite oxide as a very cheap raw material, and subsequently chemically reduced. Such graphene oxide particles or flakes may thus be chemically reduced to produce corresponding particles or flakes of graphene. Graphite is abundantly available in nature and thus graphene obtainable via oxidation to graphite oxide/graphene oxide (e.g. by a process called Hummers method) and subsequent reduction to graphene would be considerably less expensive to use in packaging materials.

It is problematic, however, to provide a thin, homogenous coating of reduced graphene oxide, by a large-scale industrial coating process, which has reduced graphene oxide, i.e. graphene, as the starting point, due to necessary organic solvents for dispersing it, and also due to the higher costs of the further refined product, i.e. the graphene oxide being reduced.

In the scientific article "Impermeable barrier films and protective coatings based on reduced graphene oxide" (by Y. Su, V. G. Kravets, S. L. Wong, J. Waters, A. K. Geim & R. R. Nair), published on 11 Sep. 2014, in "Nature Communications", it is described how a substrate material having an applied graphene oxide coating can be reduced by exposing it to hydrogen iodide vapour at 90° C. for 5-30 minutes, or by submersing it in a solution of Vitamin C as the reducing agent at a temperature of 90° C. for 1 h, to obtain a material having good gas barrier properties. Such methods are not feasible in the production of barrier layers or coatings for single use packaging materials, for reasons of economy as well as due to practical non-feasibility in packaging material converting factories. The treatment of acid steam, or the treatment of substrate materials in an almost boiling liquid for a long period of time, provides considerable risk for alterations in the materials and also is highly impracticable in manufacturing processes that normally feature continuous operations on wide-width webs and at high manufacturing speed.

There is thus a need for improved methods to apply such reduced graphene-oxide based materials into laminated packaging materials, at reasonable cost, and to satisfy the future requirements regarding recyclability and sustainable material sourcing and manufacturing.

DISCLOSURE OF THE INVENTION

It is, an object of the present invention to provide an improved method for manufacturing substrate materials coated with a barrier coating from reduced graphene-oxide, and for further laminating such barrier-coated substrate materials into packaging materials.

It is also a general object of the invention to provide a simplified method for manufacturing a barrier-coated substrate with reduced graphene oxide, providing good barrier properties as well as recyclability and capability to fulfil the requirements regarding future sustainable liquid carton laminated packaging materials.

It is a further general object of the invention to provide such a method for manufacturing non-foil laminated packaging materials for oxygen-sensitive, liquid, semi-solid or wet food products, which do not contain aluminium foil but nevertheless have excellent gas barrier properties suitable for long-term, aseptic packaging, at reasonable cost.

A particular object, is to provide a, relative to aluminium foil barrier materials, cost-efficient, non-foil, paper- or paperboard-based, laminated packaging material, having good gas barrier properties, as well as recyclability and a sustainable environmental profile for the purpose of manufacturing packages for long-term, aseptic food storage.

Yet a further object of the invention is to provide a cost-efficient, non-foil, paper- or paperboard-based, mechanically robust and heat-sealable packaging laminate having good gas barrier properties, for the purpose of manufacturing aseptic packaging containers for long-term storage of liquid foods at maintained nutritional quality under ambient conditions.

These objects are thus attainable according to the present invention by the method of manufacturing the barrier-coated substrate material web, the laminated packaging material and the packaging container, as defined in the appended claims.

SUMMARY OF THE INVENTION

According to a first aspect of the invention, a method is provided for producing an oxygen barrier material for a packaging material, by coating a substrate material web with a layer of reduced graphene oxide, which method comprises the steps of a) providing and forwarding a substrate material web, b) providing an aqueous composition comprising graphene oxide, the graphene oxide including monolayer flakes of graphene oxide and multilayer graphene oxide platelets, having up to 20, such as 2-10, stacked monolayer flakes of graphene oxide, c) coating the aqueous composition of graphene oxide onto the surface of the substrate material web while it is being forwarded, d) drying the wet coating of aqueous graphene oxide on the substrate material web, by forced evaporation, to obtain a first dry layer of layered graphene oxide particles or flakes, e) applying an aqueous solution of a reducing agent onto the first dry layer of graphene oxide on the substrate material web, f) directly following step e) drying the wet aqueous coating of the reducing agent, by forced evaporation, to obtain a second dry layer of reducing agent, and g) allowing the reducing agent of the second dry layer to reduce the graphene oxide of the underlying, first dry layer, during a minimum predetermined time at a minimum pre-determined temperature, to form a barrier-coated substrate material web with the dry layer of reduced graphene oxide.

It has surprisingly been found that by such a method the reduction reaction continues also after drying of the applied coating of the reducing agent, such that there is sufficient conversion of the graphene oxide to graphene and that excellent gas barrier properties are obtained. This was unexpected since it was hitherto believed that the solution of the reducing agent had to be applied as a liquid bath or spray or as a steam treatment and that it had to be allowed to stay wet on the surface of the graphene oxide layer for a long time to be able to reduce a dry graphene oxide layer.

It has further surprisingly been understood that also a "dry" reduction reaction may be promoted and accelerated by heating of the coated and dried substrate material web, to an elevated temperature for a certain period of time. Thus, by proper designing of a coating manufacturing line, a coated and dried substrate material web can be further and sufficiently reduced during an extended transport of the dry material web through a heating tunnel or the like, to be held at an elevated temperature. Still, such a continuous production line still has to be considerably slower than normal coating or lamination operations, and the high temperature treatment must be kept considerably lower than 90° C., to not pose a risk for changes in the properties of the substrate material web. Much advantageously, however, the manufacturing method does not have to handle wet or liquid treatments along the converting line, except from the aqueous coating operation itself.

The method may comprise a further step i) of coating or laminating the barrier-coated substrate material web to a further layer of a polymer, to cover the second dry layer of the reducing agent, to be performed before or after step g). It was surprisingly seen that the reduction reaction, between the first and second dry layers, continued also after further coating or lamination of a polymer layer, such as by extrusion coating of a thermoplastic polymer, onto the dry layer of the reducing agent. Such high-temperature, polymer-melt lamination operations do add further heat, which is acting on the surface of the barrier-coated substrate material web. Consequently, the reduction reaction is further accelerated while such lamination operations are ongoing.

The method may also, or alternatively, further comprise a step h), of winding the coated and dried, barrier-coated substrate material web onto a reel, to be performed before or after step g). It seems that the reduction reaction of the dried, first layer of graphene oxide, does not stop until it is complete, and thus it has been shown that even if no further heat treatment is performed after drying, the conversion of graphene oxide into reduced graphene oxide will continue at a lower speed until it is complete. Thus, the colour of the freshly applied graphene oxide will over time turn into black, which indicates that the graphene oxide has been nearly, and substantially fully reduced. This is a great advantage in the coating manufacturing line, because no extra heat treatment has to be built into it and because the barrier-coated substrate material web may be directly wound up onto a reel after coating and a brief drying operation, i.e.

during a minute or so only. In addition, the manufacturing speed can be as high as possible, because the reduction reaction anyway will take place later and at a slower pace. By planning the logistics around transport and distribution, of packaging material reels to customers, sufficient time to complete the reduction reaction may be provided for. Thus, by simply storing the reel with the barrier-coated substrate material web during a predetermined time after coating and drying, the reduction reaction between the ascorbic acid in the second dry layer and the graphene oxide in the first dry layer can reach a sufficient degree of conversion from graphene oxide to reduced graphene oxide.

In an embodiment, the dried, barrier-coated substrate material web from step f), before or during step g) may be irradiated to accelerate the reduction reaction taking place between the applied first and second dry layers. Such irradiation may comprise UV light, or Xenon light, or laser light. The combination of the reducing agent of the second dry coating and such supporting irradiation seems to facilitate a quicker but still balanced reduction reaction in the graphene oxide layer. Reduction of the graphene oxide layer by irradiation only, with no reducing agent present, was found difficult to control and created defects in the material.

The reducing agent may be selected from the group consisting of hydrogen iodide (HI), sodium citrate, ascorbic acid (vitamin C), lemon juice, vinegar and green tea. Preferably, the reducing agent is selected from the group consisting of sodium citrate, ascorbic acid (vitamin C), lemon juice, vinegar and green tea, and most preferably the reducing agent is ascorbic acid. The latter are the most environmentally friendly and sustainable reducing agents, and since ascorbic acid is both well approved in connection with food and the food industry and a well-functioning reducing agent, it is the best choice for such processes.

By the method of this invention, which is adapted to and suitable for industrial production, the resulting oxygen barrier transmission values of a coated substrate may be as low as 1 cc/m$^2$, 24 h, 1 atm, 23° C./50% RH, 21% oxygen.

According to a second aspect of the invention, a barrier-coated substrate material web (10) as obtained by the method of the first aspect is provided, for use as an oxygen barrier material in a laminated packaging material for liquid food products, comprising a substrate material substrate web (11) and applied onto it a dry layer from layered particles or flakes of reduced graphene oxide.

According to a third aspect of the invention, a laminated packaging material comprising the barrier-coated substrate material of the second aspect is provided. The laminated packaging material may further comprise a first outermost protective material layer and a second innermost liquid tight, heat sealable material layer.

For the purpose of carton packaging of liquid food products, the laminated packaging material further may comprise a bulk layer of paper or paperboard or other cellulose-based material, a first outermost protective material layer, a second innermost liquid tight, heat sealable material layer and, arranged on the inner side of the bulk layer of paper or paperboard, between the bulk layer and the innermost layer, the barrier-coated substrate material.

The first outermost protective material layer may be a layer or coating of a protective polymer, to prevent dirt and moisture from reaching the interior of the laminated material, such as a polymer layer, such as a thermoplastic polymer layer, such as a liquid tight and heat sealable polymer layer, such as a liquid tight and heat sealable polyolefin layer, such as polyethylene. The second innermost liquid tight and heat sealable material layer may be a thermoplastic polymer, such as a polyolefin, such as polyethylene.

The thin layer of reduced graphene oxide, which in this way may be coated onto a substrate material web, exhibits the excellent gas barrier properties of graphene as a material, and may be laminated as a "direct replacement to aluminium foil" into the standard structure of a laminated packaging materials for liquid carton packaging. In comparison to earlier attempts to produce such "direct replacement" films or barrier sheets, a substrate material web, such as a polymer film or a paper substrate, which is coated with reduced graphene oxide, will be significantly less sensitive in lamination operations and in the filling machine operations of fold-forming, filling and heat-sealing carton packages from the laminated material. This is due to the inherent durability and flexibility of graphene as a material, but also because it is a layer obtained by tightly layering of flakes overlapping each other, such that any permeation of oxygen molecules through the barrier coating has to follow a so-called tortoise path between the flakes. Such a coating is thus not sensitive to cracking upon strain and may retain its oxygen gas barrier properties well during the transformation into packages. Also, the gas barrier property of reduced graphene oxide is not sensitive to moisture and permeation of water vapour from the liquid contents of the package, and therefore will endure long term storage of such filled packaging containers.

In a fourth aspect of the invention there is provided a packaging container comprising the laminated packaging material of the third aspect, intended for packaging of liquid, semi-solid or wet food. According to an embodiment, the packaging container is manufactured at least partly from the laminated packaging material of the invention, and according to a further embodiment it is in its entirety made of the laminated packaging material.

DETAILED DESCRIPTION

With the term "long-term storage", used in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package tightness, i.e. the resistance to leakage or breakage of a packaging container. The term encompasses the resistance of the package to intrusion of microbes, such as bacteria, dirt, and other substances, that may deteriorate the filled food product and shorten the expected shelf-life of the package.

One main contribution to the integrity of a package from a laminated packaging material is provided by good internal adhesion between adjacent layers of the laminated material. Another contribution comes from the material resistance to defects, such as pinholes, ruptures and the like within each material layer itself, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers. Regarding the sealing of the packages, the integrity is mainly focussed on the quality of the sealing joints, which is ensured by well-functioning and robust sealing operations in the filling machines, which in turn is ensured by adequately adapted heat-sealing properties of the laminated packaging material.

The term "liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, wine, soups, jalapenos, tomatoes, sauce (such as pasta sauce), beans and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container. For the continued asepticity during the shelf-life of the package, the package integrity properties are of course very important. For long-term shelf-life of a filled food product, it may furthermore be important that he package has barrier properties towards gases and vapours, such as towards oxygen gas, in order to keep its original taste and nutritional value, such as for example its vitamin C content.

With the term "bulk layer" is normally meant the thickest layer or the layer containing the most material in a multi-layer laminate, i.e. the layer which is contributing most to the mechanical properties and the dimensional stability of the laminate and of packaging containers folded from the laminate, such as paperboard or carton. It may also mean a layer providing a greater thickness distance in a sandwich structure, which further interacts with stabilising facing layers, which have a higher Young's modulus, on each side of the bulk layer, in order to achieve sufficient such mechanical properties and dimensional stability.

Thickness measurements were performed by Transmission Electronic Microscopy using a Titan 80-300, FEI equipment. Samples may be prepared by ultramicrotomy on an EM UC6 Microtome from Leica.

OTR was measured with an Oxtran 2/21 (Mocon) equipment based on coulometric sensors.

The method for determining OTR identified the amount of oxygen per surface and time unit at passing through a material at a defined temperature, a given atmospheric pressure, during a certain time, e.g. at an atmosphere of 21% oxygen, during 24 hours.

Water vapour transmission rate (WVTR) measurements were carried out by a Permatran 3/33 (Mocon) instrument (norm: ASTM F1249-13 using a modulated Infrared sensor for relative humidity detection and WVTR measurement) at 38° C. and 90% driving force.

The term "graphene oxide" includes monolayer flakes of graphene oxide and multilayer graphene oxide platelets, having up to 20, such as 2-10, stacked monolayer flakes of graphene oxide. Only smaller amounts, i.e. lower than 15 weight-%, such as lower than 10 weight-%, such as lower than 5 weight-%, based on dry weight of the graphene oxide material, may be graphite oxide flakes that have been exfoliated to a number of graphene oxide monolayer flakes higher than 20, but which have a smaller lateral particle size than bulky graphite oxide particles, i.e. so-called "graphite oxide nano-platelets", which are thus still nano-sized.

Such smaller amounts of such laterally nano-sized graphite flakes may be present as long they do not reduce the performance of the graphene-based material too much. Preferably, nano-graphite flakes/platelets are present in the composition only in lower amounts than 15 weight-%, such as weight-%, such as 5 weight-% or less, based on dry weight.

Suitable graphene oxide materials for aqueous dispersions, useable for the present invention, are e.g. a pure quality, exfoliated to at least 95%, from Graphenea or paste graphene oxide from Abalonyx.

The substrate suitable for barrier-coatings as of the invention is thus not limited to a certain type of substrates, but includes polymer films as well as papers, paperboard or other cellulose-based substrates, or polymer-coated papers, paperboards or polymer-coated other cellulose-based substrates. The substrate material web may be a polymer film web, a paper or a paperboard web, or a polymer-coated paper or paperboard web.

Polymer film substrates may e.g. be made of polyesters or polyolefins. Typical polyesters are polyethylene terephthalate (PET), polybutylene terephthalate (PBT), of the type polyhydroxyalkanoates (PHA) and polylactic acids (PLA). Typical polyolefin films may be made of a majority of polypropylene or polyethylene, such as biaxially oriented polypropylene (BOPP), or biaxially oriented high density polyethylene (BOHDPE), or linear low density polyethylene (LLDPE).

Cellulose-based substrates may be based on any type of native cellulose, fibrous or fibrillar cellulose and they may further be coated with a polymer of the above types, preferably with a polyolefin such as polyethylene, for subsequent application of a barrier coating according to the method of the invention.

Normally, a suitable paper or cellulose-based substrate material for carrying the barrier coating of the invention should be thin, such as 60 g/m² or below, such as 50 g/m² or below, preferably 45 g/m² or below and more preferably 40 g/m² or below. On the other hand, cellulose-based substrates thinner or with a lower grammage than 30 g/m² may be mechanically too weak and/or less dimension stable, when they are coated with wet dispersions and subsequently dried, thus exhibiting shrinkage or curling problems. It is thus more preferred to use papers having a grammage of from 30 to 50 g/m², such as most preferable from 35 to 45 g/m².

In an embodiment, the concentration of the graphene oxide in the aqueous composition is from 0.1 to 15 weight-%, such as from 0.5 to 15 weight-%, such as from 0.5 to 10 weight-%, such as from 0.5 to 6 weight-%, such as from 0.5 to 3 weight-%, such as from 1 to 2 weight-%. If the concentration is lower than 0.5 weight-%, it may be difficult to coat sufficiently much graphene oxide onto the substrate material web, such that the applied coating may not provide sufficient oxygen barrier properties, but it is possible to coat thinner if the needs of barrier properties are lower, such as down to 0.1 weight-%. On the other hand, if the concentration is higher than 6 weight-%, such as higher than 10 weight-%, such as higher than 15 weight-%, the applied coating may be more difficult to dry because the applied wet coating of graphene oxide material is unnecessarily thick and contains a lot of water in between the flakes and platelets of the composition. Already if the concentration of graphene oxide is higher than 3 weight-%, the coating may be difficult to dry and above 6 weight-%, it may be more difficult to apply it. Aqueous compositions of graphene oxide exhibit shear thinning behaviour, however, such that the thicker compositions may still be possible to apply at reasonable coating thickness and good layer formation, at a higher coating speed.

The aqueous composition of graphene oxide comprises essentially only the graphene oxide and water. There are substantially no further polymers in the composition, i.e. no binders or similar components. Preferably, it comprises only up to 5 weight-%, such as up to 3 weight-% of additives, such as dispersing agents, antifoaming agents or the like. Thus, the aqueous composition of graphene oxide, may comprise from 0.1 to 15 weight-% of the graphene oxide, from 0 to 5 weight-% of additives and from 85 to 99.9 weight-% of water.

In an embodiment, the aqueous composition of graphene oxide is coated at a wet thickness from 10 to 400 μm. If thinner than 10 μm, the coating may not provide sufficient oxygen barrier properties, and if thicker than 400 μm, the amount of water to dry off from the coating, or the viscosity of a thicker coating composition, may be impractical or impossible to handle.

For coating with the second layer comprising a reducing agent, the concentration of the reducing agent, ascorbic acid (Vitamin C), is from 0.5-15 weight-%, such as from 1 to 10 weight-%, such as from 2 to 7 weight-%, such as from 3 to 6 weight-%. A solution with at least 0.5, such as 1 weight-% of ascorbic acid is necessary for the desired effect of reducing graphene oxide at all, and a better lower range limit of a well-functioning concentration is at about 2, preferably 3 weight-%. At a concentration of above 7 weight-%, the effect is not significantly greater and at above 10 weight-%, it seems less useful to increase the concentration further, there seems to be no increased effect.

The drying steps d) and f) of the method of the invention may be carried out by forced evaporation.

Furthermore, the substrate may be forwarded at a constant speed. For optimal and reliable amounts of the coating to be applied, this is an important pre-requisite in the coating operation. Furthermore, industrially viable web and coating speeds may be from 100 m/min, such as from 200 m/min, such as from 300 m/min, such as from 400 m/min, depending on dimensions of drying capacity in the coating line. Drying is suitably performed by hot air convection, which may be combined with irradiation by infrared heaters. Drying of the wet coating takes place in a few seconds at most, during passage through the drying station, which may be many meters long, such as at least 5 meters long, such as at least 10 meters long, such as at least 15 meters long, such as at least 20 meters long, depending on the temperature of the substrate surface and the speed at which the web travels forward in the coating line.

The graphene oxide is thus dispersed in water and may be applied by means of an aqueous "dispersion coating" process, or a so called "liquid film coating" process. Fully aqueous dispersions are preferred from environmental sustainability, as well as from work safety point of view.

The aqueous composition may be applied to the substrate material web in the form of an ink and/or a dispersion coating.

Suitable application methods may thus be suitable printing methods, such as flexographic printing, rotogravure printing, screen printing, ink-jet printing and various dispersion coating methods, such as gravure roll coating, slot coating, doctor blade coating, reverse roll coating, wire bar coating, lip coating, air knife coating, curtain coating and spray coating, dip coating, and brush coating. By these printing or coating methods, suitable dry material thicknesses of from 0.1 to 10 μm, such as from 0.5 to 8 μm, such as from 0.5 to 6 μm, such as from 0.5 to 4 μm, such as from 0.5 to 3 μm, such as from 0.5 to 2.5 μm of the graphene oxide coating layer may be applied.

Several consecutive coating steps to form a thick layer of graphene oxide may be needed to obtain the higher thicknesses. For the purpose of providing a gas barrier coating, it will suffice to apply from 0.1 to 3 μm, such as from 0.5 to 2.5 μm, such as about 2 μm, of dry graphene oxide. For other purposes, such as for conductive coatings or other purposes, thicker coatings may be suitable, but perhaps not as full-surface covering coatings, but as coatings applied only to selected, local areas of a substrate material web.

The experiments for the present invention were performed by means of gravure coating, but it is believed that any of the above liquid film coating methods would be suitable to provide a good gas barrier coating.

An additive amount of a dispersion stabiliser or a similar additive for dispersion coatings, may also be included in the aqueous graphene oxide composition, preferably in an amount of not more than about 1 weight % based on the dry coating.

The total dry content of the aqueous composition comprising graphene oxide should be from 0.5 to 15 weight-%, such as from 0.5 to 10 weight-%, such as from 0.5 to 8 weight-%, such as from 0.5 to 6 weight-%. At lower dry contents the gas barrier layer formation will likely not be good enough quality and consequently the resulting gas barrier properties may not be very good from the dried coating.

In an embodiment, a coating of graphene oxide may be applied in two consecutive steps with intermediate drying, as two part-layers. When applied as two part-layers, each layer is suitably applied in amounts from 0.1 to 1.5 g/m$^2$, such as from 0.5 to 1 g/m$^2$, and allows a higher quality total layer from a lower amount of liquid gas barrier composition. As an example, a total thickness of about 2 μm of dry applied graphene oxide will after reduction to reduced graphene oxide have a total thickness of about 0.5 μm (500 nm). It has been evaluated that two consecutive applied and dried coatings of graphene oxide, after coating and drying with an aqueous ascorbic acid solution, will reduce the graphene oxide equally readily as a correspondingly thick, dry single coating of graphene oxide. Consecutively applied and dried coatings of graphene oxide may cover up for a possible defect in each coating, since it is in most cases overlapping with a non-defectious part of another coating. In this way, the total applied layer of graphene oxide may be virtually defect-free.

The graphene oxide coating may be applied directly onto a paper or paperboard substrate material, but then requires that the surface to be coated is smooth and compact such that the coating can be evenly and coherently formed.

For best performance of the invention, a graphene oxide layer coated onto a paper or cellulose-based substrate material web, may be preceded by a thin pre-coating of a polymer, suitably also applied in the form of an aqueous composition in a preceding dispersion coating step. The thickness of such a thin pre-coating may be from 0.5 to 1.5 μm, such as about 1 μm.

The polymer of the pre-coating may be any suitable water-dispersible polymer and/or renewable, non-fossil-based polymer. In an embodiment, the polymer of the pre-coating may be selected from the group consisting of polyvinylalcohol (PVOH, PVAL), polyethylenevinylalcohol (EVOH, EVAL), a polyolefin, such as water dispersible polyethylene, starch, modified starch, methyl cellulose, ethyl cellulose, carboxymethyl cellulose CMC, hydroxy ethyl cellulose HEC, hydroxy propyl cellulose HPC, hydroxypropylmethyl cellulose HPMC, sodium carboxymethyl cellulose NaCMC, nano-/microfibrillar cellulose (NFC/MFC/CNF) and nanocrystalline cellulose (NCC/CNC).

In a further embodiment, the pre-coating may comprise a renewable polymer or substance selected from the group consisting of starch, modified starch, methyl cellulose, ethyl cellulose, carboxymethyl cellulose CMC, hydroxy ethyl cellulose HEC, hydroxy propyl cellulose HPC, hydroxypropylmethyl cellulose HPMC, sodium carboxymethyl cellulose NaCMC, nano-/microfibrillar cellulose (NFC/MFC/CNF) or nanocrystalline cellulose (NCC/CNC).

Such natural, plant-based, non-fossil-based polymers or substances may provide a good surface smoothness for providing an even graphene oxide coating layer.

Suitable starch materials, or derivatives of starch, may e.g. be oxidised starch, cationic starch and hydroxypropylated starch.

In an embodiment, the pre-coating polymer is a very thin coating of polyethylene, which may support neat separation of the reduced graphene oxide coating from the paper or paperboard substrate material, such that recycled fibres may be substantially kept free from the reduced graphene oxide material.

A further protective polymer coating of a low density polyethylene may be applied onto the reduced graphene oxide layer, including any remaining ascorbic acid on its surface, for the purpose of protection as the barrier coated substrate material web may be further wound onto a roll, or further laminated into a multilayer material structure. By such encapsulation of the reduced graphene oxide between layers of polyethylene, the reduced graphene oxide may be kept separate from the fibre fraction in later recycling operations.

A carton-based laminated packaging material for liquid food packaging comprises a bulk layer of paper or paperboard, a first outermost protective material layer, a second innermost liquid tight, heat sealable material layer and, arranged on the inner side of the bulk layer of paper or paperboard, towards the inside of a packaging container made from the packaging material, between the bulk layer and the innermost layer, a barrier-coated substrate material web.

A paper or paperboard bulk layer for use in the invention usually has a thickness of from about 100 μm up to about 600 μm, and a surface weight of approximately 100-500 g/m$^2$, preferably about 200-300 g/m$^2$, and may be a conventional paper or paperboard of suitable packaging quality.

For low-cost aseptic, long-term packaging of liquid food, a thinner packaging laminate may be used, having a thinner paper core layer. The packaging containers made from such packaging laminates are not fold-formed and more similar to pillow-shaped flexible pouches. A suitable paper for such pouch-packages usually has a surface weight of from about 50 to about 140 g/m$^2$, preferably from about 70 to about 120 g/m$^2$, more preferably from 70 to about 110 g/m$^2$. If the barrier-coated substrate material web in this invention in itself contributes with some stability to the laminated material, the paper layer corresponding to a "bulk" layer may be even thinner, and interact with the barrier-coated substrate material web in a sandwich structure to still produce a laminated packaging material having the desired mechanical properties altogether.

The substrate material web may be a polymer film web, a paper or a paperboard web, or a polymer-coated paper or paperboard web.

The substrate suitable for barrier-coatings as of the invention is thus not limited to a certain type of substrates, but includes polymer films as well as papers, paperboard or other cellulose-based substrates, or polymer-coated papers, paperboards or polymer-coated other cellulose-based substrates. Polymer film substrates may e.g. be made of polyesters or polyolefins. Typical polyesters are polyethylene terephthalate (PET), polybutylene terephthalate (PBT), of the type polyhydroxyalkanoates (PHA) and polylactic acids (PLA). Typical polyolefin films may be made of a majority of polypropylene or polyethylene, such as biaxially oriented polypropylene (BOPP), or biaxially oriented high density polyethylene (BOHDPE), or linear low density polyethylene (LLDPE).

Cellulose-based substrates may be based on any type of native cellulose, fibrous or fibrillar cellulose and they may further be coated with a polymer of the above types, preferably with a polyolefin such as polyethylene, for subsequent application of a barrier coating according to the method of the invention.

The thickness of the dry layer from layered particles or flakes of reduced graphene oxide may be from 50 to 1000 nm, such as from 100 to 800 nm, such as from 200 to 700 nm, such as from 200 to 600 nm, such as from 400 to 600 nm such as from 450 to 550 nm.

The dry layer from layered flakes or particles of reduced graphene oxide may be further coated with a thin protective coating of a thermoplastic polymer, such as dispersion coatable polyethylene or another water soluble or water dispersible polymer. It may further be laminated to an adjacent polymer layer, such as a polyolefin layer, such as a low density polyethylene. Such further coating and/or lamination may be performed before or after fully reducing the graphene oxide of the first dry layer of graphene oxide.

The barrier-coated substrate material web may be bonded to the bulk layer by an intermediate adhesive, or thermoplastic polymer bonding layer, thus binding the un-coated surface of the barrier-coated substrate material web to the bulk layer. According to an embodiment the bonding layer is a polyolefin layer, such as in particular a layer of a polyethylene-based polyolefin copolymer or blend, including in the majority ethylene monomer units. The bonding layer may be binding the bulk layer to the barrier-coated substrate material web by melt extrusion laminating the bonding polymer layer between a web of the bulk layer and a web of the substrate material, and simultaneously pressing the three layers together while being forwarded through a lamination roller nip, thus providing a laminated structure by extrusion lamination.

In another embodiment, the barrier-coated substrate material web may be bonded to the bulk layer by wet application of an aqueous dispersion of an adhesive composition comprising an adhesive polymer binder onto one of the web surfaces to be laminated, and pressing the two paper webs together while they are forwarded through a lamination roller nip, thus providing a laminated structure by wet lamination. The moisture of the aqueous adhesive composition is absorbed into the fibrous cellulose network of the bulk paperboard, and partly evaporating with time, during the subsequent lamination processes. There is thus no need for a forced drying step. The adhesive polymer binder is selected from the group consisting of acrylic polymers and copolymers, starch, cellulose and polysaccharide derivatives, polymers and copolymers of vinyl acetate and vinyl alcohol. For best possible environmental and sustainability profile, adhesive binders originating from plants or non-fossil sources are preferred.

Suitable thermoplastics for the outermost and innermost heat sealable liquid-tight layers are polyolefins such as polyethylene and polypropylene homo- or co-polymers, preferably polyethylenes and more preferably polyethylenes selected from the group consisting of low density polyethylene (LDPE), linear LDPE (LLDPE), single site catalyst metallocene polyethylenes (m-LLDPE) and blends or copolymers thereof. According to an embodiment, the outermost heat sealable and liquid-tight layer is an LDPE, while the innermost heat sealable, liquid-tight layer is a blend composition of m-LLDPE and LDPE for optimal lamination and heat sealing properties.

The outermost layer is typically applied at a thickness of from 5 to 20 μm, such as from 10 to 15 μm. The innermost layer may be applied at thicknesses ranging from 10 to 50 μm, such as from 10 to 40 μm, such as from 10 to 30 μm, such as from 10 to 25 μm.

The same thermoplastic polyolefin-based materials, as listed regarding the outermost and innermost layers, and in particular polyethylenes, are also suitable in bonding layers interior of the laminated material, i.e. between a bulk or core layer, such as paper or paperboard, and a barrier film or sheet. In an embodiment, the thermoplastic bonding layer may be a polyethylene layer, such as a low density polyethylene (LDPE) layer. It may typically be applied at an amount from 10 to 25 μm, such as from 10 to 20 μm, such as from 10 to μm.

In a further embodiment, the second innermost liquid tight, heat sealable polyolefin layer is a pre-manufactured film comprising the same or similar polyolefins, as described above, for improved robustness of the mechanical properties of the packaging material. Due to the manufacturing process in film blowing and film casting operations, and optional subsequent film orientation operation steps, the polymers of such films acquire different properties from what is possible from (co-) extrusion coated polyolefin layers. Such a pre-manufactured polymer film thus contributes to the mechanical robustness of a laminated packaging material and to mechanical strength and package integrity of formed and filled packaging containers from the laminate packaging material.

According to an alternative embodiment, suitable bonding or tie layers in the interior of the laminated material, such as for example between the bulk or core layer and the barrier-coated substrate material web, or between the outer heat sealable layer and the barrier-coated substrate material web, are also so-called adhesive thermoplastic polymers, such as modified polyolefins, which are mostly based on LDPE or LLDPE co-polymers or, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

If necessary, the surface of the substrate material web may be pre-treated by an oxidizing treatment such as corona-plasma- or ozone-treatment, in order to improve the adhesion strength to the layer of graphene oxide or reduced graphene oxide.

A laminated packaging material made according to the above provides good integrity when transformed into filled packaging containers, by good adhesion between the adjacent layers within the laminated construction and by providing good quality of the barrier coating and the barrier pre-coating, each and in combination.

According to further embodiment, the packaging container formed from the laminated packaging material may be partly sealed, filled with liquid or semi-liquid food and subsequently sealed, by sealing of the packaging material to itself, optionally in combination with a plastic opening or top part of the package.

To conclude, robust and reliable packages, having excellent oxygen gas barrier, for liquid food packaging for long term shelf-life and storage may be obtained by the barrier-coated substrate material web as manufactured by the method of the invention, and the laminated packaging material thus obtained. The laminated packaging material structure works better for the forming into fold-formed packages, both from the improved adhesion between the substrate and the barrier material coatings and from the improved contribution to gas barrier properties from the barrier-coated substrate itself, which likely also is due to the improved combined cohesion and adhesion of the pre-coatings and barrier coating layers in the barrier-coated cellulose-based substrate.

EXAMPLES AND DESCRIPTION OF PREFERRED EMBODIMENTS

Figure 1B:
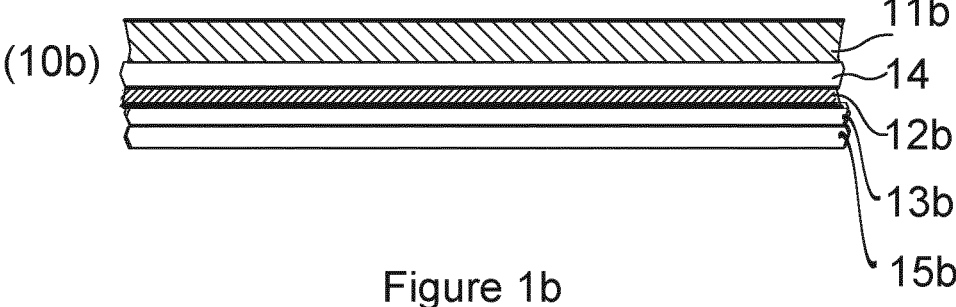
Figure 2A:
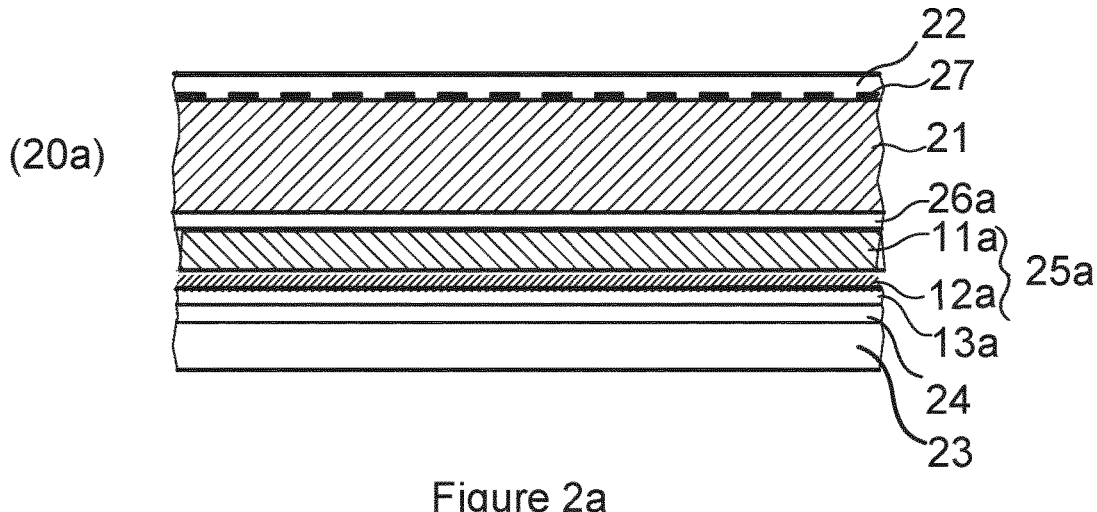
Figure 2B:
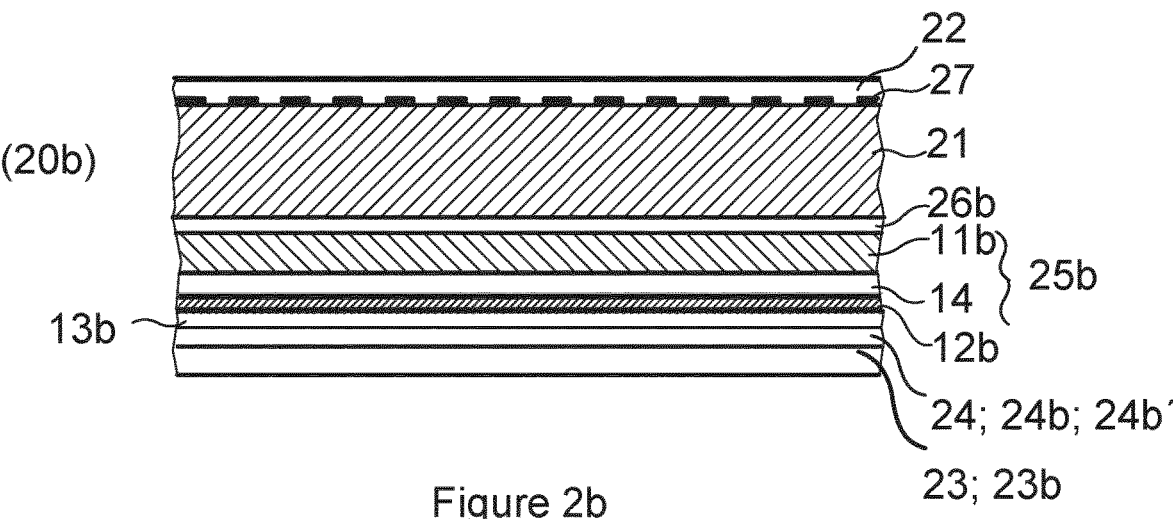
Figure 3:
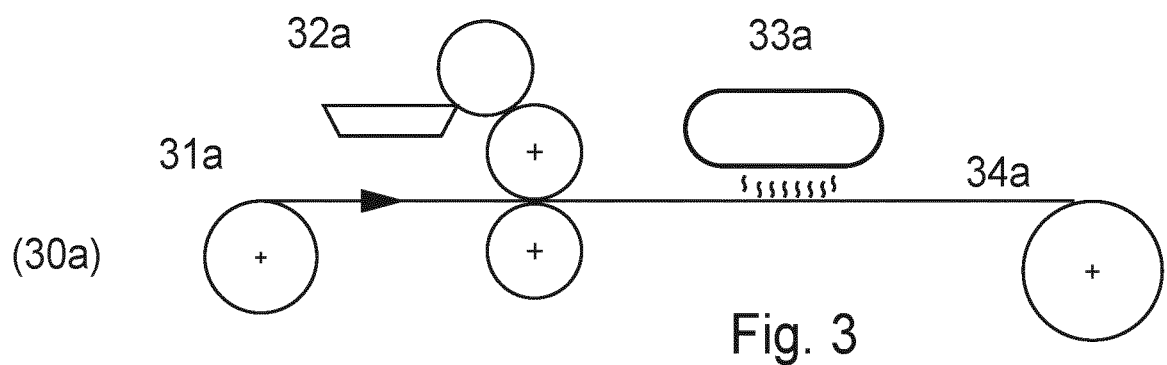
Figure 4A:
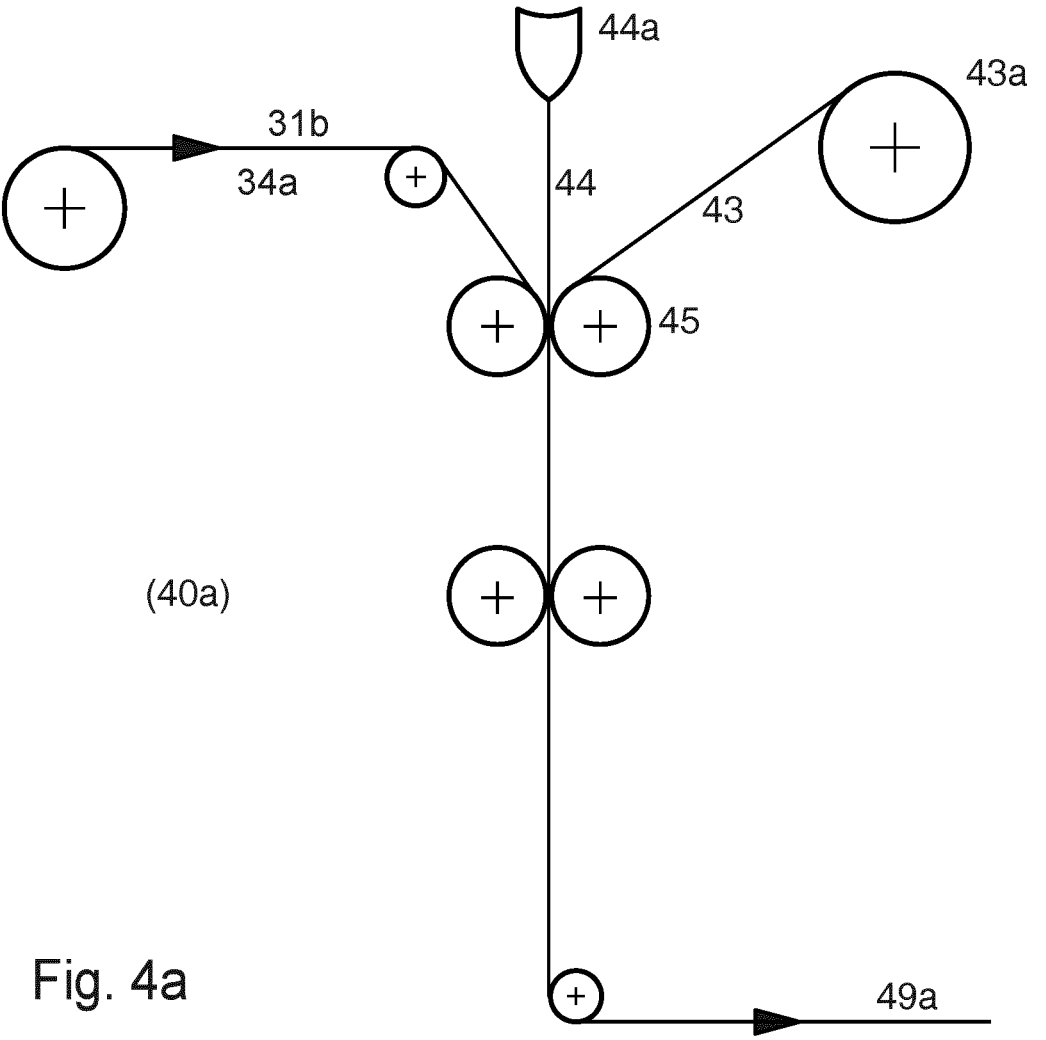
Figure 4B:
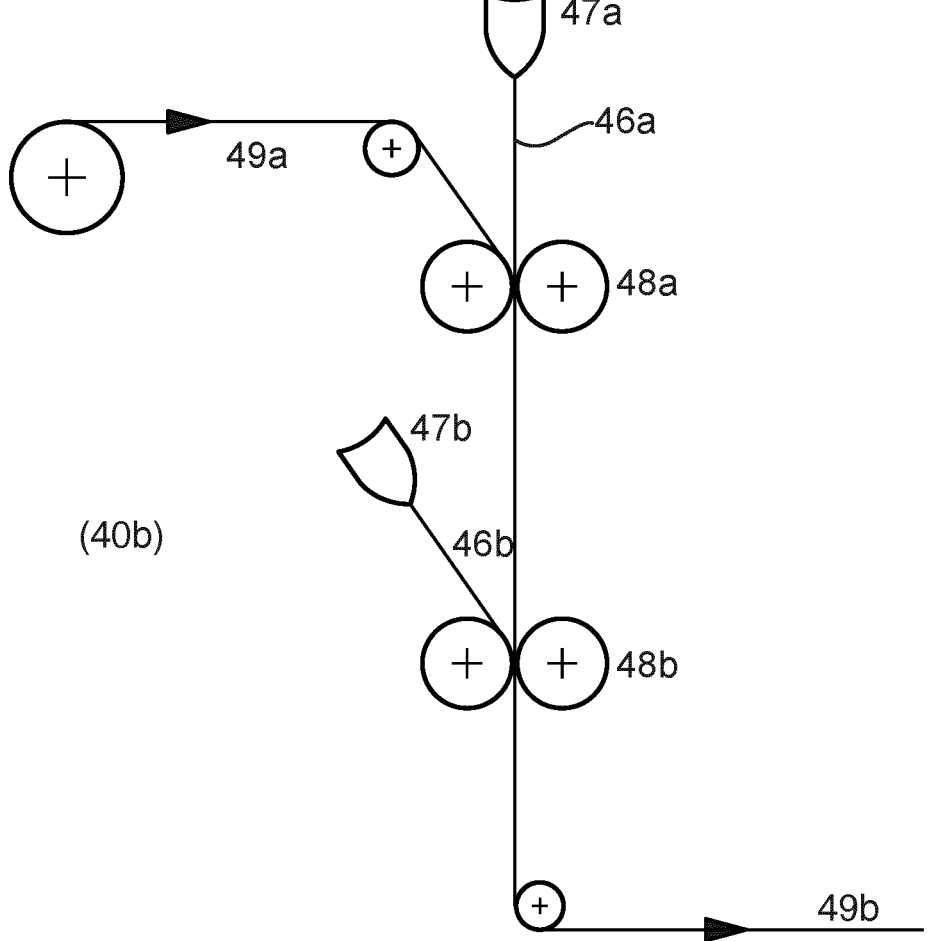
Figure 5A:
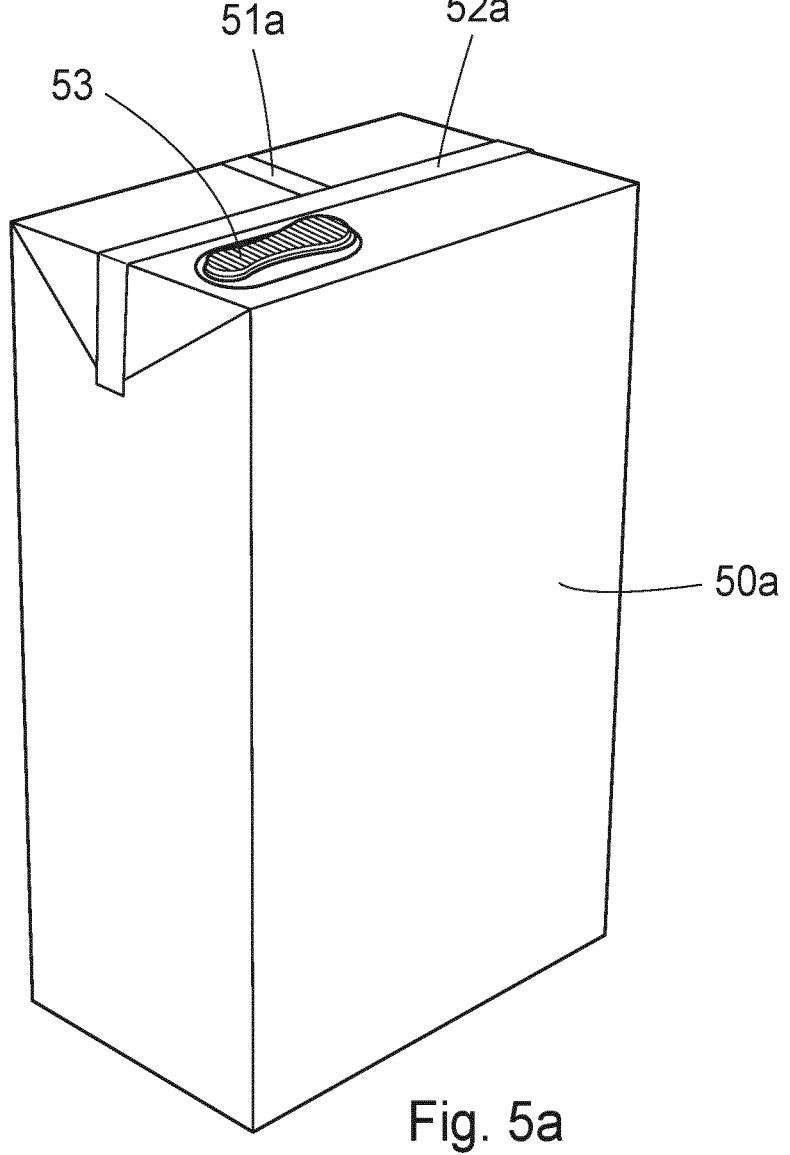
Figure 5B:
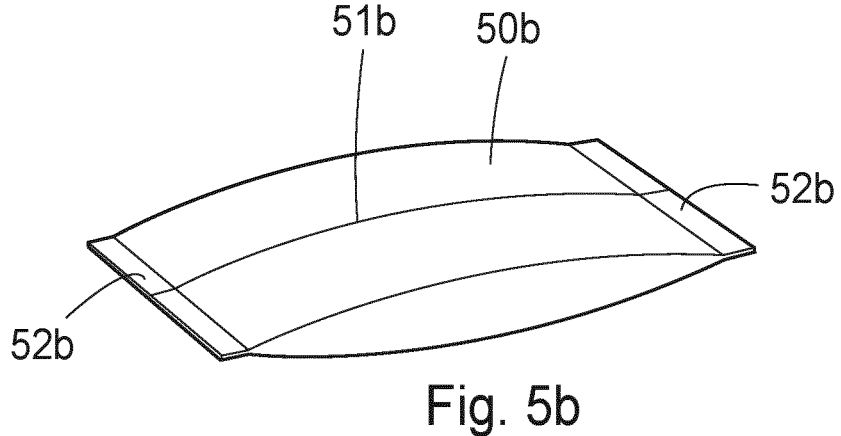
Figure 5C:
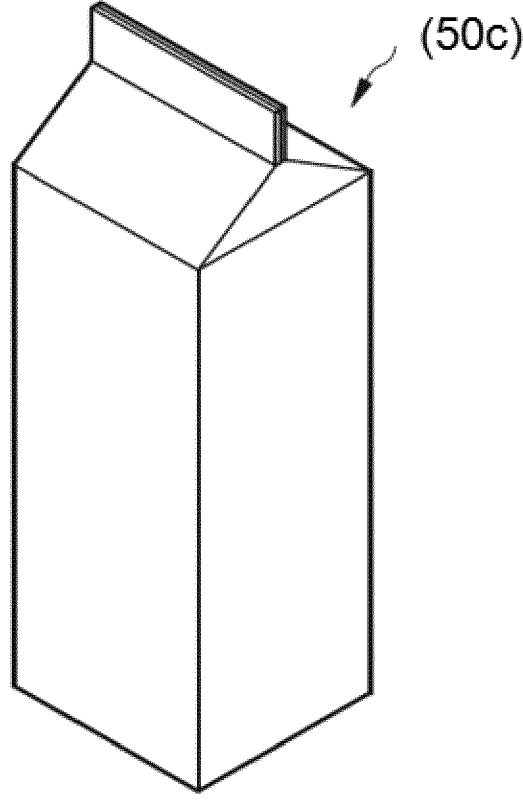
Figure 5D:
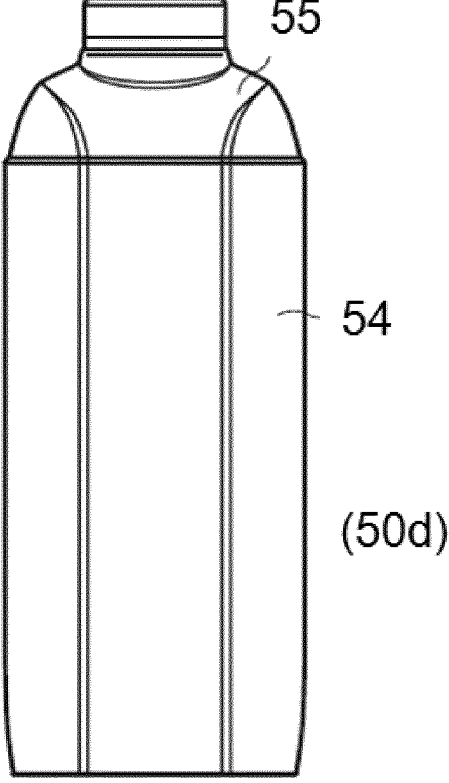
Figure 6:
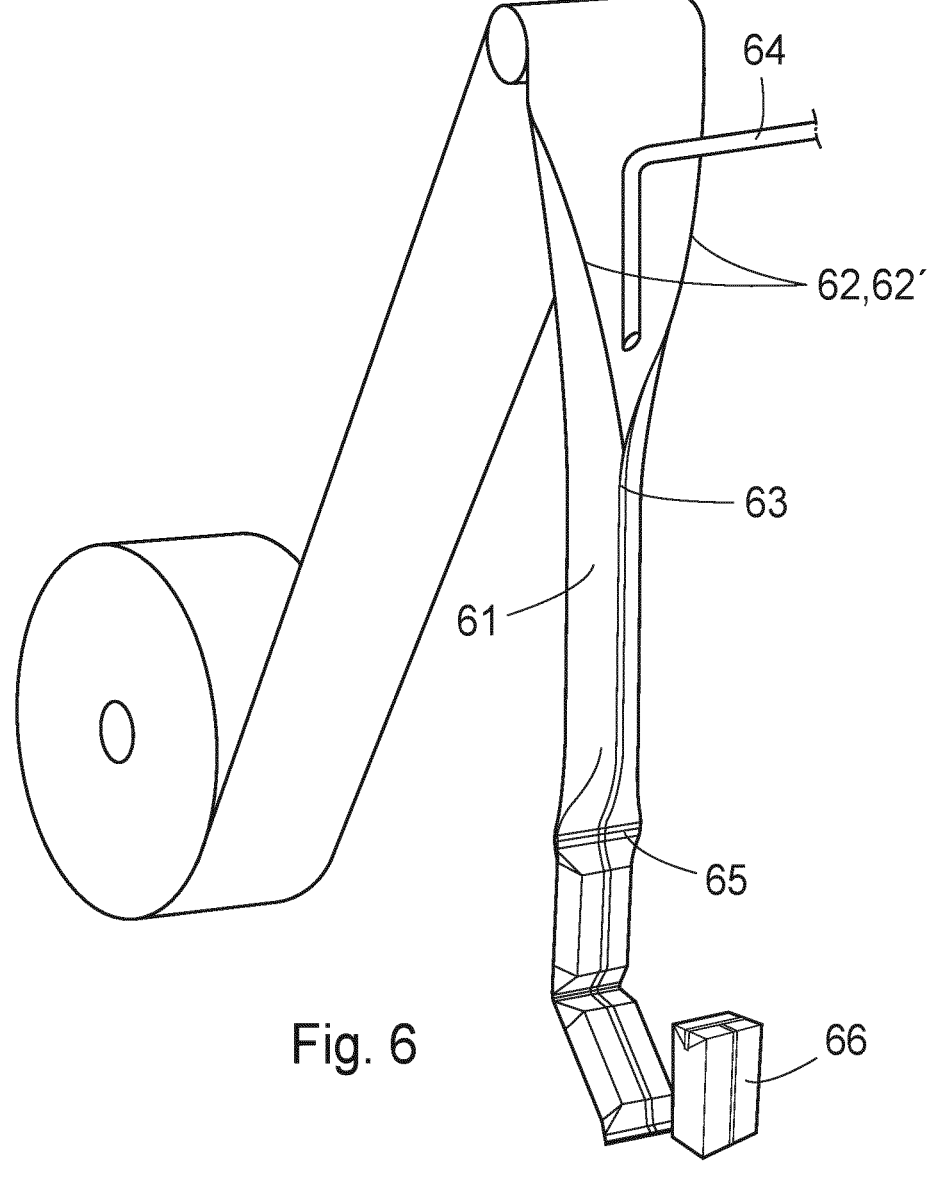

In the following, preferred embodiments of the invention will be described with reference to the drawings, of which:

FIG. 1a schematically shows in cross-section an embodiment of a substrate coated with reduced graphene oxide according to the invention, FIG. 1b schematically shows a different embodiment of a substrate coated with reduced graphene oxide according to the invention, FIG. 2a shows a schematic, cross-sectional view of a laminated packaging material according to the invention, comprising the substrate coated with reduced graphene oxide of FIG. 1a, FIG. 2b shows a schematic, cross-sectional view of a laminated packaging material according to the invention, comprising the substrate coated with reduced graphene oxide of FIG. 1b, FIG. 3 shows schematically a method, for dispersion coating an aqueous composition of graphene-oxide onto a substrate, FIG. 4a shows schematically a method, for melt extrusion laminating together two material webs by means of an intermediate thermoplastic polymer, FIG. 4b shows schematically a method, for melt (co-) extrusion coating layer(s) of a thermoplastic polymer onto a web substrate, e.g. to form innermost and outermost layers of a packaging laminate of the invention, FIGS. 5a, 5b, 5c and 5d are showing typical examples of liquid carton packaging containers produced from the laminated packaging material according to the invention, and FIG. 6 is showing the principle of how such liquid carton packaging containers are manufactured from the packaging laminate in a continuous, roll-fed, form, fill and seal process.

EXAMPLES

Example 1

An aqueous dispersion of 1 weight-% of monolayer flakes of graphene oxide (pure quality, exfoliated to at least 95%, from Graphenea), was continuously stirred up to the moment of application onto a substrate. The well dispersed aqueous composition was thus applied onto a forward-moving web of paperboard pre-coated with polyethylene (liquid paperboard of 80 mN bending stiffness and a grammage of 200 $g/m^2$) to a wet thickness of about 400 µm, by means of a Hirano lab-coater. The water in the applied coating composition was evaporated off from the surface by air convection in a hot air dryer, at a web surface temperature of about 60° C. for about 1 minute. The resulting dry coating thickness of graphene oxide applied onto the PE-coated paper was measured to about 2.2 µm.

The resulting substrate thus coated with a 2.2 µm thin dry coating of layered graphene oxide exhibited an oxygen transmission of about 25 $cc/m^2$, 24 h, 1 atm, 23° C./50% RH, 21% oxygen as measured by an Ox-Tran 2/21 Mocon instrument. The substrate coated with graphene oxide had a light brown colour.

The thus graphene-oxide coated web was subsequently further coated with an aqueous solution of 3 weight-% ascorbic acid, and dried again at about 60° C. surface temperature of the web during about 1 minute, cooled down to room temperature and finally wound onto a reel.

From the same coated and dried web of coated paperboard, samples were also taken to be continuously maintained at a higher surface temperature of 60° C. for 2 hours. In these samples, it was concluded that the graphene oxide at least in the surface portion of the coated graphene oxide had been completely reduced by a reduction reaction with the ascorbic acid added by the final coating after the time period at elevated temperature. The colour of the coated paperboard had changed from light brown to dark brown. The OTR was measured of these samples, in the same way as above, and found to be below 1 $cc/m^2$, 24 h, 1 atm, 23° C./50% RH, 21% oxygen, two days later (the time it takes to condition the samples for OTR measurement). By this time, the samples had also turned completely black. The resulting dry coating thickness of the coating with this reduced graphene oxide was measured to be 530 nm, i.e. about 0.5 µm. Thus the distance between the graphenic flakes had become lower by the reduction reaction of the graphene oxidic flakes, to provide the much improved barrier properties, and this reduction process thus happened within the dried coating of graphene oxide, and over time.

Consequently, by reducing the applied graphene oxide to graphene, even if only partially or at the surface of the coating, the oxygen barrier level was considerably improved to a level that is needed and desired in laminated packaging materials intended for aseptic liquid carton packaging, i.e. lower than 1 $cc/m^2$, 24 h, 1 atm, 23° C./50% RH, 21% oxygen.

Before the 2 hours of such reduction reaction at elevated temperature, the samples did not exhibit a full reduction of the graphene oxide at the surface, indicated also by the coating colour being still light brown.

Further samples from the reel were also later taken after 1 and 2 weeks storage at ambient temperature (23° C.) and compared with the heat treated samples. After 1 week ambient storage, wound-up on the reel, the reduction reaction had progressed within the dry layer on the paper to a higher level, but still not to full reduction level. This was indicated by such samples having obtained a dark brown, almost black, colour and OTR in the order of about 10 $cc/m^2$, 24 h, 1 atm, 23° C./50% RH, 21% oxygen.

After 2 weeks, the reduction seemed to be complete, by having obtained a black colour, as with the samples maintained at the elevated temperature for only 2 hours. This was concluded by measuring correspondingly low OTR values on samples from the reel, i.e. below 1 $cc/m^2$, 24 h, 1 atm, 23° C./50% RH, 21% oxygen.

Accordingly, it seems that the Williams-Landel-Ferry model, or WLF for short, applies to the reduction reaction, and that the reduction reaction may be accelerated and controlled by increased temperature and/or increased reaction time. Most importantly, it seems the reduction reaction continues at the interface between the dried coatings of graphene oxide and ascorbic acid until full conversion degree, even after the drying of the coated web and after winding it up onto a reel for transport and storage.

Since a reaction time of 2 hours is barely feasible in an industrial coating and manufacturing process, this result is advantageous, because it means that the reduction to graphene in the applied coating of graphene oxide may still be continued to completion after the coating operation. It may thus be achieved merely by logistically planning for a pro-longed storage of the barrier-coated web, before further use. It is also possible to laminate the barrier-coated substrate web to further layers to form a finished packaging material, before the planned storage of the reels. In the case of lamination methods involving heat supply, such as polymer melt extrusion coating or polymer melt extrusion lamination, further acceleration of the reduction reaction may advantageously and conveniently be achieved. Further intermediate storage may be planned to take place partly also during transport, and partly before shipping and/or partly after shipping at a customer facility, depending on practical circumstances.

Further, relating to the attached figures:

In FIG. 1a, there is shown, in cross-section, an embodiment of a barrier-coated substrate material web 10a, of the invention. The substrate material 11a is a film of polyethyleneterephthalate (PET) having a thickness of 36 μm. It has an oxygen transmission (OTR) of about 30 cc/m², 24 h, 23° C./% RH, 100% oxygen.

The PET film is provided with a dry coating 12a of graphene oxide, applied by means of aqueous dispersion coating and subsequently heat dried to evaporate off the water. The dry weight of the graphene oxide coating thus applied is about 1.3 μm. Further, the thus coated substrate material has a second dry coating layer 13a of ascorbic acid applied, as a 3 weight-% aqueous solution of ascorbic acid, onto the first dry coating layer of graphene oxide. The second dry coating layer 13a has also been applied as an aqueous solution coating and subsequently heat dried to evaporate off the water. The dry, thus coated substrate material web may be further heat treated for a period of time, or simply stored at ambient temperature for at least two weeks, whereafter the first dry barrier coating layer of graphene oxide has been reduced as far as possible to reduced graphene oxide, i.e. ideally to graphene. After the reduction reaction is as complete as possible, the thickness of the dry barrier coating 12a has been significantly reduced as well. Thus, in the example above, the dry graphene oxide layer had a thickness immediately after drying of about 1.3 μm, while the final thickness of the reduced same graphene oxide was 300 nm, i.e. about 0.3 μm. The OTR was measured to be 0.1 cc/m², 24 h, 23° C./80% RH, 100% oxygen. If the same film substrate was coated with half the thickness on each side, i.e with 150 nm dry reduced graphene oxide on each side of the film, the OTR was instead 0.02 cc/m², 24 h, 23° C./80% RH, 100% oxygen.

Furthermore, the robustness of the coatings of reduced graphene oxide can be illustrated by a test according to which the coated material is folded and unfolded once, twice and up to twenty times (according to a similar principle to a Flex-Gelbo test). After the first folding, the OTR increased to cc/m², 24 h, 23° C./80% RH, 100% oxygen, but after 20 folding operations, it had not increased any further. Moreover, the reduced graphene oxide is not moisture sensitive, such that is loses its barrier properties at higher humidity, as would for example PVOH. Thus, the OTR at 80% RH would be the same for the barrier-coated film of this example.

In FIG. 1b, there is shown, in cross-section, a different embodiment of a barrier-coated substrate material web 10b, of the invention. The substrate material 11b is a thin paper substrate having a grammage of 50 g/m², provided with a thin pre-coating 14 of low density polyethylene, applied by dispersion coating and subsequently drying, thus having a final dry thickness of about 1 μm. Onto the dry surface of the polyethylene pre-coating, there is applied a dry layer 12b of graphene oxide, of the same kind and applied in the same manner as in FIG. 1a. The dry weight of the graphene oxide coating is thus about 2 μm. Further, the thus coated substrate material has a second dry coating layer 13b of ascorbic acid applied onto the first dry coating layer of graphene oxide, in the same way as in FIG. 1a, which is subsequently dried and treated in the same way. A further protective polymer coating 15b of a low density polyethylene may be applied onto the reduced graphene oxide layer including remaining ascorbic acid on its surface, for the purpose of protection as the barrier coated substrate material web is further wound onto a roll. After sufficient time, when the graphene oxide of layer 12b was reduced (i.e. after two weeks dry storage in a dark room or on a roll), the thickness of the barrier coating with the resulting reduced graphene oxide was finally about 500 nm. The OTR was measured to be below 1 cc/m², 24 h, 1 atm, 23° C./50% RH, 21% oxygen, two days later (the time it takes to condition the samples for OTR measurement).

A protective polymer coating 15a such as the one in FIG. 1b, may optionally be applied also on the graphene oxide layer 12a in FIG. 1a, although not shown.

In FIG. 2a, a laminated packaging material 20a for liquid carton packaging is shown, in which the laminated material comprises a paperboard bulk layer 21 of paperboard, having a bending force of 80 mN and a grammage weight of about 200 g/m², and further comprising an outer liquid tight and heat sealable layer 22 of polyolefin applied on the outside of the bulk layer 21, which side is to be directed towards the outside of a packaging container produced from the packaging laminate. The layer 22 is transparent to show the printed décor pattern 27, applied onto the bulk layer of paper or paperboard, to the outside, thus informing about the contents of the package, the packaging brand and other information targeting consumers in retail facilities and food shops. The polyolefin of the outer layer 22 is a conventional low density polyethylene (LDPE) of a heat sealable quality, but could also include further similar polymers, including LLDPEs. It is applied at an amount of about 12 g/m². An innermost liquid tight and heat sealable layer 23 is arranged on the opposite side of the bulk layer 21, which is to be directed towards the inside of a packaging container produced from the packaging laminate, i.e. the layer 23 will be in direct contact with the packaged product. The thus innermost heat sealable layer 23, which is to form strong transversal heat seals of a liquid packaging container made from the laminated packaging material, comprises one or more in combination of polyethylenes selected from the groups consisting of LDPE, linear low density polyethylene (LLDPE), and LLDPE produced by polymerising an ethylene monomer with a C4-C8, more preferably a C6-C8, alpha-olefin alkylene monomer in the presence of a metallocene catalyst, i.e. a so called metallocene-LLDPE (m-LLDPE). It is applied at an amount of about 22 g/m².

The bulk layer 21 is laminated to the barrier-coated PET film substrate material 25a; 10a of FIG. 1a, by an intermediate bonding layer 26a of a low density polyethylene (LDPE). The intermediate bonding layer 26a is formed by means of melt extruding it as a thin polymer melt curtain between the two webs, and thus laminating the bulk paperboard layer and the barrier-coated PET film substrate to each other, as all three layers pass through a cooled press roller nip. The thickness of the intermediate bonding layer 26a is from 12 to 18 μm, more specifically from 12-15 μm.

The innermost heat sealable layer 23 may consist of one layer or alternatively of two or more part-layers of the same or different kinds of LDPE or LLDPE or blends thereof, and is well adhered to the surface of the barrier layer of the barrier-coated PET film substrate 10a; 25a, by an intermediate coextruded tie layer 24, e.g. of ethylene acrylic acid copolymer (EAA), which is thus bonding the innermost heat sealable layer(s) to the barrier surface of the barrier-coated substrate material web 10a, in applying the layers together in a single melt coextrusion coating step.

Alternatively, the barrier-coated PET film substrate 10a; 25a may be turned in the opposite direction in the laminate, i.e. with the barrier coating layer directed towards the bulk layer and the outside of the laminated material.

In FIG. 2b, a different laminated packaging material 20b of the invention, for liquid carton packaging, is shown, in which the laminated material has a similar layer structure as in FIG. 2a, except regarding the barrier-coated substrate material 25b, which is different in configuration, but positioned at the same place in the laminated material.

The bulk layer 21 is laminated to the uncoated side of the barrier-coated paper substrate 25b; 10b, from FIG. 1b (excepting the further protective layer 15b), by means of wet lamination with an intermediate bonding layer 26b of a thin layer of adhesive polymer, obtained by applying an aqueous dispersion of a polyvinyl acetate adhesive onto one of the surfaces to be adhered to each other and subsequently pressing together in a roller nip. This lamination step is performed in an efficient cold or ambient lamination step at industrial speed without any energy-consuming drying operation needed to accelerate the evaporation of the water. The dry amount applied of the intermediate bonding layer 26b is from 3 to 4 g/m² only, and there is no need for a drying and evaporation operation.

Thus, the amount of thermoplastic polymer can be significantly reduced in this lamination layer, in comparison to the conventional melt extrusion laminated bonding layer of polyethylene, described in FIG. 2a, as layer 26a.

The innermost heat sealable layer 23 is applied at an amount of about 22 g/m² onto the barrier-coated surface of the paper substrate material by an intermediate coextruded tie layer, e.g. of ethylene acrylic acid copolymer (EAA), which thus bonds the innermost heat sealable layer(s) 23 to the barrier coated paper substrate 10b, in applying the layers together in a single melt coextrusion coating step.

Alternatively, the innermost heat sealable and liquid-tight layer is a pre-manufactured, blown film 23b, comprising LDPE or LLDPE polymers in any blends thereof, and it may be laminated to the barrier-coated paper substrate, i.e. to the surface of its barrier coating, by means of an intermediate, melt extrusion laminated bonding layer 24b, comprising a thicker tie layer of EAA than the layer 24 used in FIG. 2a, or a more simple bonding layer of LDPE. The thickness of the blown film 23b, is 12 μm, but may be up to 20 μm.

In an alternative embodiment, the pre-manufactured blown film 23b is laminated to the metallised coating by means of another wet lamination step, with an aqueous adhesive of an acrylic (co)polymer adhesive layer 24b″, at ambient (cold) temperature, at an amount from 3 to 4 g/m².

Further embodiments, having all the features as described and a melt extruded bulk layer lamination layer 26a of FIG. 2a, but which is instead combined with the features of a barrier-coated paper substrate material 25b and an innermost heat sealable layer configuration 23b″, applied either by means of melt extrusion lamination with a layer 24b, or by means of wet laminating a pre-manufactured film, 24b″, as described in connection to FIG. 2b, are hereby also disclosed.

A yet further embodiment, wherein the thin, wet, aqueous adhesive dispersion laminated layer 26a of FIG. 2b is combined with the conventional melt coextrusion coated inside layers 24a and 23a, is hereby also disclosed.

In FIG. 3, a process of aqueous dispersion coating 30a is shown, which may be used for applying the graphene oxide barrier coating 12a; 12b and the further coating of ascorbic acid 13a; 13b. The paper substrate web 31a (e.g. the paper 11 from FIG. 1a, 1b is forwarded to the dispersion coating station 32a, where the aqueous dispersion composition is applied by means of rollers onto the top surface of the substrate surface. Since the dispersion composition has an aqueous content of from 80 to 99 weight-%, there will be a lot of water on the wet coated substrate that needs to be dried by heat, and evaporated off, to form a continuous coating, which is homogenous and has an even quality with respect to barrier properties and surface properties, i.e. evenness and wettability. The drying is carried out by a hot air dryer 33a, which allows the moisture to evaporate and be removed from the surface of the substrate surface by air convection. The substrate temperature as it travels through the dryer, is kept constant at a temperature of from 60 to 80° C. Alternatively, drying may be partly assisted by irradiation heat from infrared IR-lamps, in combination with hot air convection drying. The process shown in FIG. 3 is subsequently repeated with coating with an aqueous solution of ascorbic acid at a concentration of 3 weight-% and drying thereof, in the same way.

The resulting barrier pre-coated paper substrate web 34a is forwarded to cool off and is wound up onto a reel for intermediate storage and later further lamination operations.

FIG. 4a shows a process for the lamination steps in the manufacturing of the packaging laminate 20a or 20b, of FIGS. 2a and 2b, respectively, as the bulk layer 21; 43 is laminated to the barrier-coated substrate material web 34a; 10a; 10b of FIG. 1a or 1b, (i.e. 25a or 25b of FIGS. 2a and 2b respectively).

As explained in connection to FIGS. 2a and 2b, the bulk layer paperboard 21 may be laminated to the barrier-coated substrate material 10; 25a; 25b by means of melt extrusion lamination as shown in this figure, or by means of wet, cold dispersion adhesive lamination, the latter method however not shown. Thus, a molten polymer curtain 44 of e.g. LDPE is fed into a nip of lamination rollers 45, as the two webs 34a and 43 are also forwarded to the same lamination nip and joined to each other by the extruded bonding layer 44 of LDPE. The three layers are thus pressed together and joined at the nip which is formed between a press roller and a chill roller, thus cooling the laminated material to properly solidify the extruded bonding layer of LDPE 44. The resulting laminated material is forwarded to be wound up on a reel for intermediate storage, or directly to subsequent lamination operations.

In FIG. 4b, the resulting pre-laminate 49a, of paperboard 31b and barrier web 34a, is forwarded to further lamination steps 40b, either directly from the lamination operation 40a of FIG. 4a, or from engaging and unwinding from an intermediate storage reel.

The non-laminated side of the bulk layer 21, i.e. its print side, is joined at a cooled roller nip 48a to a molten polymer curtain 46a of the LDPE, which is to form the outermost layer 22 of the laminated material, the LDPE being extruded from an extruder feedblock and die 47a. Subsequently, the paper pre-laminated web, now having the outermost layer 22 coated on its printed side, the outside, passes a second extruder feedblock and die 47b and a lamination nip 48b, where a molten polymer curtain 46b is joined and coated onto the other side of the pre-laminate, i.e. on uncoated, inner side of the barrier-coated substrate material web 10a; 10b; 25a; 25b. Thus, the innermost heat sealable layer(s) 23 are coextrusion coated onto the inner side of the barrier-coated substrate material web, to form the finished laminated packaging material 49b, which is finally wound onto a storage reel, not shown.

These two coextrusion steps at lamination roller nips 48a and 48b, may alternatively be performed as two consecutive steps in the opposite order.

According to another embodiment, one or both of the outermost layers may instead be applied in a pre-lamination station, where the coextrusion coated layer is first applied to the outside of the (printed) bulk paperboard layer or onto the inner surface of the barrier-coated paper substrate, and thereafter the two pre-laminated paper webs may be joined to each other, as described above, in connection to FIG. 4a.

According to a further embodiment, the innermost layers of the heat sealable and liquid-tight thermoplastic layers may be applied in the form of a pre-manufactured film, which is laminated to the barrier-coated substrate material 10a; 10b.

As explained in connection to FIGS. 2a and 2b, the innermost layer pre-manufactured film 23 may be laminated to the barrier-coated substrate material 10a; 10b by means of wet, cold dispersion adhesive lamination, or by means of melt extrusion lamination.

FIG. 5a shows an embodiment of a packaging container 50a produced from a packaging laminate according to the invention. The packaging container is particularly suitable for beverages, sauces, soups or the like. Typically, such a package has a volume of about 100 to 1000 ml. It may be of any configuration, but is preferably brick-shaped, having longitudinal and transversal seals 51a and 52a, respectively, and optionally an opening device 53. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the only partly folded packaging container is still is easy to handle and dimensionally stable enough to put on a shelf in the food store or on any flat surface.

FIG. 5b shows an alternative example of a packaging container 50b produced from an alternative packaging laminate according to the invention. The alternative packaging laminate is thinner by having a thinner paper bulk layer, and thus it is not dimensionally stable enough to form a parallellepipedic or wedge-shaped packaging container, and is not fold formed after transversal sealing 52b. The packaging container will remain a pillow-shaped pouch-like container and be distributed and sold in this form.

FIG. 5c shows a gable top package 50c, which is fold-formed from a pre-cut sheet or blank, from the laminated packaging material comprising a bulk layer of paperboard and the barrier-coated substrate material of the invention. Also flat top packages may be formed from similar blanks of material.

FIG. 5d shows a bottle-like package 50d, which is a combination of a sleeve 54 formed from a pre-cut blanks of the laminated packaging material of the invention, and a top 55, which is formed by injection moulding plastics in combination with an opening device such as a screw cork or the like. This type of packages are for example marketed under the trade names of Tetra Top® and Tetra Evero®. Those particular packages are formed by attaching the moulded top 55 with an opening device attached in a closed position, to a tubular sleeve 54 of the laminated packaging material, sterilizing the thus formed bottle-top capsule, filling it with the food product and finally fold-forming the bottom of the package and sealing it.

FIG. 6 shows the principle as described in the introduction of the present application, i.e. a web of packaging material is formed into a tube 61 by overlapping the longitudinal edges 62, 62' of the web and heat sealing them to one another, to thus form an overlap joint 63. The tube is continuously filled 64 with the liquid food product to be filled and is divided into individual, filled packages by repeated, double transversal seals 65 of the tube at a pre-determined distance from one another below the level of the filled contents in the tube. The packages 66 are separated by cutting between the double transversal seals (top seal and bottom seal) and are finally shaped into the desired geometric configuration by fold formation along prepared crease lines in the material.

As a final remark, the invention is not limited by the embodiments shown and described above, but may be varied within the scope of the claims.

The invention claimed is:

1. A method for producing an oxygen barrier material for a packaging material, by coating a substrate material web with a layer of reduced graphene oxide, comprising
   a) providing and forwarding the substrate material web,
   b) providing an aqueous composition comprising from 0.1 to 15 weight-% of graphene oxide, from 0 to 5 weight-% of additives and from 85 to 99.9 weight-% of water, the graphene oxide including monolayer flakes of graphene oxide and multilayer graphene oxide platelets, having up to 20 stacked monolayer flakes of graphene oxide,
   c) coating the aqueous composition of graphene oxide onto the surface of the substrate material web while the substrate material web is being forwarded,
   d) drying the wet coating of aqueous graphene oxide on the substrate material web, by forced evaporation, to obtain a first dry layer of layered graphene oxide particles or flakes on the substrate material web,
   e) applying an aqueous solution of a reducing agent onto the first dry layer of graphene oxide on the substrate material web,
   f) directly following step e) drying the wet aqueous coating of the reducing agent, by forced evaporation, to obtain a second dry layer of reducing agent on the substrate material web,
   g) forming a barrier-coated substrate material web with a dry layer of reduced graphene oxide by exposing the first dry layer of layered graphene oxide particles or flakes to the second dry layer of reducing agent for a minimum predetermined time at a minimum pre-determined temperature, and performing a further step i) and/or a further step h) before step g), wherein the step i) is coating or laminating the substrate material web with a further layer of a polymer to cover the second dry layer of the reducing agent, and wherein the step h) is winding the coated and dried, substrate material web onto a reel.

2. The method according to claim 1, wherein the concentration of the graphene oxide in the aqueous composition is from 0.5 to 15 weight-%.

3. The method according to claim 1, wherein the wet coated thickness of the aqueous composition of graphene oxide is from 10 to 400 μm.

4. The method according to claim 1, wherein the reducing agent is selected from the group consisting of sodium citrate, ascorbic acid (vitamin C), lemon juice, vinegar and green tea.

5. The method according to claim 1, wherein the reducing agent is ascorbic acid.

6. The method according to claim 1, wherein the concentration of the reducing agent is from 0.5 to 15 weight-%.

7. The method according to claim 1, wherein the substrate material web from step f), before or during step g) is irradiated to accelerate the reduction reaction taking place between the applied first and second dry layers.

8. The method according to claim 1, wherein the substrate material web is continuously forwarded at a constant speed.

9. The method according to claim 1, wherein the multilayer graphene oxide platelets have 2-10 stacked monolayer flakes of graphene oxide.

10. A method for producing an oxygen barrier material for a packaging material, by coating a substrate material web with a layer of reduced graphene oxide, the method comprising:

a) coating an aqueous composition onto a substrate material web to form a wet coating on the substrate material web, the aqueous composition that is coated onto the substrate material web including from 0.1 to 15 weight-% of graphene oxide, from 0 to 5 weight-% of additives and from 85 to 99.9 weight-% of water, the graphene oxide including monolayer flakes of graphene oxide and multilayer graphene oxide platelets, having up to 20 stacked monolayer flakes of graphene oxide, b) drying the wet coating on the substrate material web by forced evaporation to obtain a first dry layer of layered graphene oxide particles or flakes on the substrate material web, c) applying an aqueous solution of a reducing agent onto the first dry layer of graphene oxide on the substrate material web to form a wet aqueous coating of the reducing agent on the substrate material web, d) directly following step c) drying the wet aqueous coating of the reducing agent, by forced evaporation to obtain a second dry layer of reducing agent on the substrate material web, e) forming a barrier-coated substrate material web with a dry layer of reduced graphene oxide by exposing the first dry layer of layered graphene oxide particles or flakes to the second dry layer of reducing agent for a minimum predetermined time at a minimum pre-determined temperature, and performing a further step f) and/or a further step g) before step e), wherein the step f) is coating or laminating the substrate material web with a further layer of a polymer to cover the second dry layer of the reducing agent, and wherein the step h) is winding the coated and dried, substrate material web onto a reel.

* * * * *